United States Patent
Keeth et al.

(10) Patent No.: US 6,590,795 B2
(45) Date of Patent: Jul. 8, 2003

(54) HIGH SPEED DATA CAPTURE CIRCUIT FOR A DIGITAL DEVICE

(75) Inventors: Brent Keeth, Boise, ID (US); Chris G. Martin, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 09/790,809

(22) Filed: Feb. 23, 2001

(65) Prior Publication Data

US 2002/0118563 A1 Aug. 29, 2002

(51) Int. Cl.$^7$ ................................................ G11C 5/06
(52) U.S. Cl. ................ 365/63; 365/189.05; 365/189.08
(58) Field of Search ........................ 365/51, 63, 189.05, 365/189.08

(56) References Cited

U.S. PATENT DOCUMENTS

| | | | | |
|---|---|---|---|---|
| 5,163,092 A | * | 11/1992 | McNesby et al. | 380/28 |
| 5,689,539 A | * | 11/1997 | Murakami | 370/20 |
| 5,786,800 A | * | 7/1998 | Gyouten | 345/98 |

FOREIGN PATENT DOCUMENTS

| | | |
|---|---|---|
| JP | 2000 049575 A | 2/2000 |
| JP | 2000 235363 A | 8/2000 |
| JP | 20001 034647 A | 2/2001 |

* cited by examiner

Primary Examiner—Son T. Dinh
(74) Attorney, Agent, or Firm—Dickstein Shapiro Morin & Oshinsky LLP

(57) ABSTRACT

A data capture circuit for an integrated circuit is disclosed which includes providing respective data paths between a latch and clock terminal and a latch and an associated data terminal, the length of each of the paths for a given latch device being approximately equal.

87 Claims, 7 Drawing Sheets

HIGH SPEED DATA CAPTURE CIRCUIT FOR A DIGITAL DEVICE

FIELD OF THE INVENTION

The present invention relates to the circuitry used to capture data entering a high speed digital device, for example, a high speed memory device.

BACKGROUND OF THE INVENTION

On high speed digital devices, for example, high speed memory devices, one of the more difficult specifications to guarantee is data input setup and hold time. The difficulty stems from an inability to exactly time an arriving data capture clock with arriving data signals appearing at each capture latch. In general, the incoming clock is distributed in some form, e.g., clock distribution circuitry, so that the clock signal appearing at each capture latch has the same phase (timing). The clock distribution circuitry introduces a finite delay to the clock such that the clock and data, as they appear at the latch, do not have the same timing relationship as they had at the device input terminals. Historically, designers have either resorted to one of two approaches to correct this problem. The first is to add some form of delay to the data signal before it enters the latch. Ideally, this delay matches the amount of delay experienced by the clock signal as it propagates through the clock distribution circuitry. In general the delay circuit only approximates the actual delay. The second approach employs a delay lock loop (DLL) to add additional delay to the clock such that it appears at the latch with the correct timing relative to the data. The amount of additional delay is adjusted with feedback to account for the clock distribution delay and any additional delays due to miscellaneous Input/Output (I/O) circuits. In most cases, the clock that appears at the latch will be delayed by N x (clock period), where N is an integer. As a result, a given data bit will be captured by a clock edge which preceded the data bit by multiple clock cycles. The use of a DLL is disadvantageous for a high speed memory device needing tight (low tolerance) setup and hold times for several reasons. First, the DLL introduces additional jitter to the clock signal, which reduces the accuracy of the clock timing. Second, since the clock edge which captures the data is not the same clock edge that was transmitted with that data and cycle-to-cycle jitter problems may be introduced into the capture timing. If the data is captured with the concurrent clock edge, then cycle to cycle jitter can be ignored in the setup and hold budget. Also, a DLL introduces some timing uncertainty since it relies upon the matching of an I/O model to actual I/O circuits. Furthermore, the DLL is not able to track out instantaneous changes in delay of the clock or data circuits since it may not see these changes or it may be too slow to correct for them.

Accordingly, conventional capture circuitry using DLL or other clock distribution may not perform well in high speed memory devices which have tight set up and hold times.

SUMMARY OF THE INVENTION

The present invention provides an improved method and apparatus for capturing data in high speed digital devices, e.g., memory devices which does not require use of a DLL to properly time the arrival of the clock and data at a data capture latch.

In one aspect of the invention, a data capture circuit for a digital device, e.g., a memory device, is provided in which the capture clock and data signal are respectively routed from an incoming clock terminal (or a clock buffer) and an input data terminal (or a data buffer) to each capture latch in a point-to-point fashion with approximately the same signal path length from each of the terminals to the latch. For multiple data inputs, the path length between the clock input terminal (or clock buffer) and a latch associated with a data input and between the latch and the data input terminal (or data buffer) are approximately equal for each latch, and the path lengths for all the data capture latches may be approximately equal or unequal.

In another aspect of the invention, the latch is physically located on a digital die at a position which is approximately midway of the physical distance between a clock terminal (or clock buffer) and data terminal (or data buffer) of the memory device.

These and other advantages and features of the invention will be more clearly recognized from the following detailed description which is provided in connection with the accompanying drawings.

DETAILED DESCRIPTION OF THE INVENTION

Figure 1:
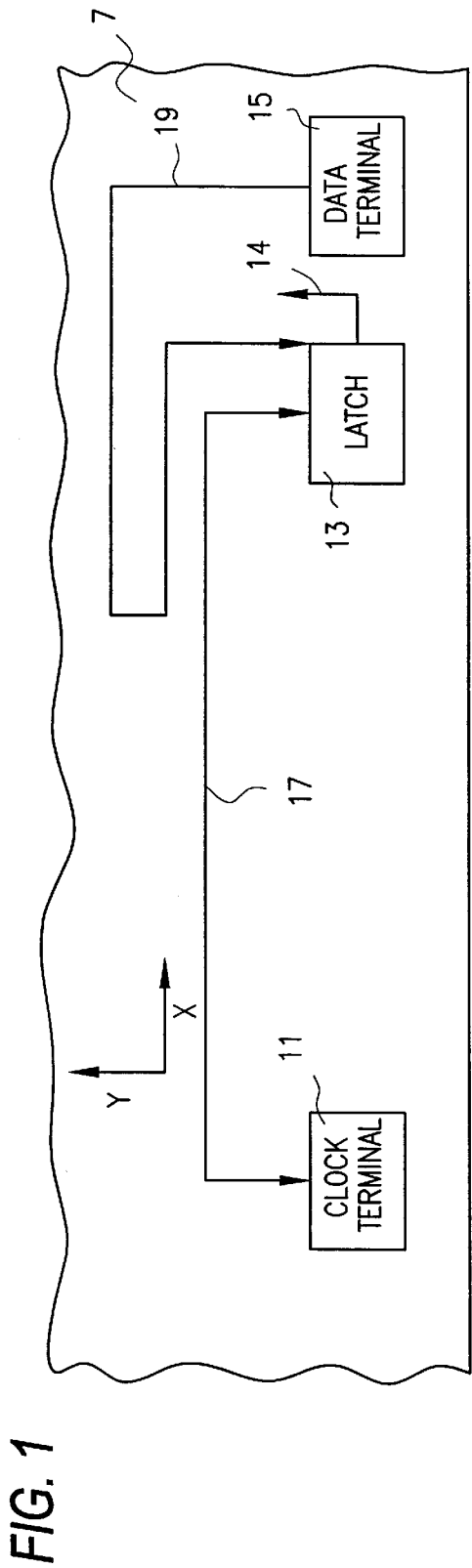
FIG. 1 is a simplified block diagram illustrating a first embodiment of a data capture arrangement in a digital device in accordance with the invention.

FIG. 1 illustrates a first simplified embodiment of the invention in which a data capture circuit a digital device 7 is illustrated. The digital device 7 is fabricated as an integrated circuit to include a clock terminal 11 for receiving an externally applied clock signal and a data terminal 15 for receiving an externally applied data signal which is to be captured by the digital device 7. A data latch 13 having a data output 14 is also provided for latching in data applied to data terminal 15 under control of a clock signal which is applied to clock terminal 11. Only one of several data terminals 15 is shown in FIG. 1 for simplicity. As further illustrated in FIG. 1, the latch for latching data applied to terminal 15 is connected to each of the clock terminal 11 and data terminal 15 by a point-to-point connection. The point-to-point connection between the latch 13 and clock terminal 11 is illustrated as conductive path 17 while the point-to-point connection between the data terminal 15 and latch 13 is illustrated as conductive path 19.

In accordance with the invention, the path lengths of the conductive paths 17 and 19 are made to be approximately equal. Approximately equal in the context of the present invention means that one path is no more than 10% longer or shorter than the other path. Preferably, the conductive paths 17 and 19 are substantially equal in length.

By ensuring that the conductive paths 17 and 19 are of approximately equal length, the data applied on data terminal 15 is quickly and reliably latched by the clock signal appearing on clock terminal 11. Moreover, by having path length 17 approximately equal to path length 19, a tight set up and hold specification can be obtained while minimizing data capture circuit cost and required power.

The arrangement illustrated in FIG. 1 assumes that there are no clock or data buffers between the clock terminal 11 and the latch 13, or between the data terminal 15 and latch 13. However, the invention would also be applicable if buffer circuits were provided for each of the clock terminal 11 and data terminal 15, with the buffers being provided at the locations of respective terminals and the paths 17 and 19 being approximately equal between the clock and data buffers and latch 13.

Figure 2:
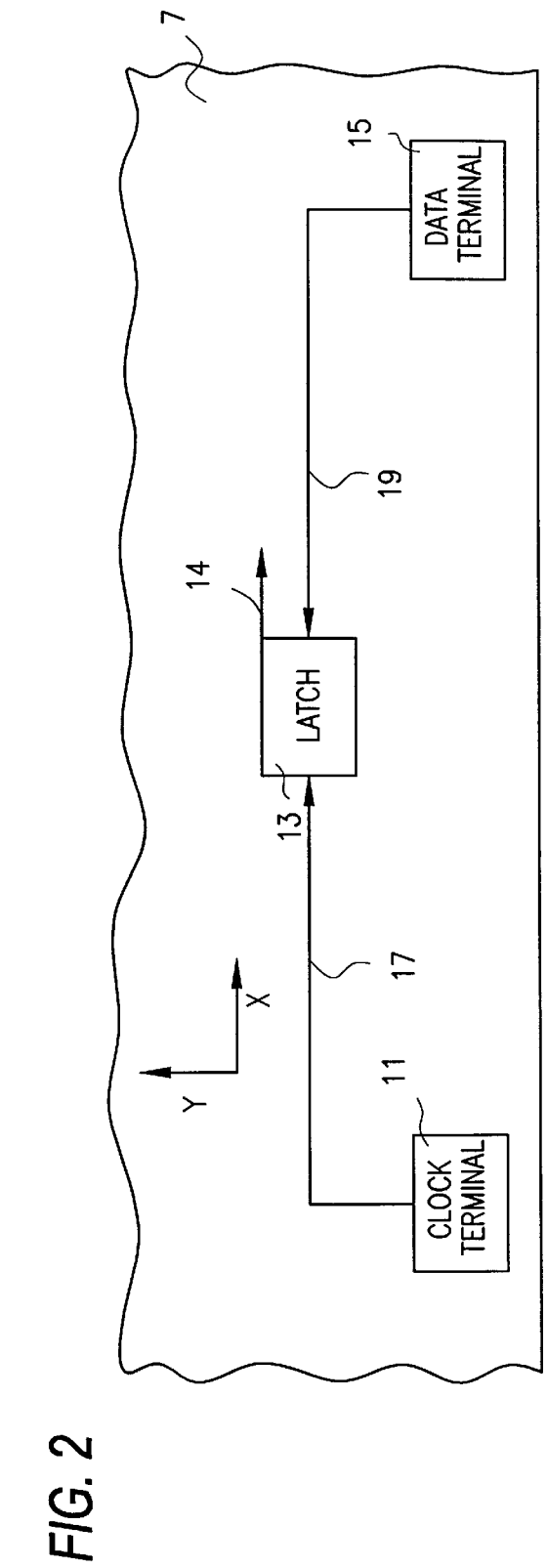
FIG. 2 is a simplified block diagram illustrating a second embodiment of a data capture arrangement in a digital device in accordance with the invention.

The FIG. 1 arrangement illustrates an arrangement in which the data latch 13 is provided in relatively close proximity to an associated data terminal 15. FIG. 2 illustrates an alternative arrangement in which the data latch 13 is approximately physically centered between the location of the clock terminal 11 and data terminal 15. In this arrangement, the conductive path between the clock terminal 11 and latch 13 is again shown as 17, and the conductive path between latch 13 and the data terminal 15 is again shown as 19. Once again, the path lengths of conductive path 17 and conductive path 19 are approximately equal to one another due to the approximate physical centering of latch 13 between the clock terminal 11 and data terminal 15 in the X die direction illustrated in FIG. 2.

One of the advantages of the FIG. 2 arrangement is that a single long conductive track can be laid on the integrated circuit die to form the respective data conductive paths 17 and 19 which have path portions which are co-linear with each other, whereas in the FIG. 1 arrangement several different tracks or conductive segments are needed in the X and Y directions of the die to form each of the conductive data paths 17 and 19. More specifically, three X direction tracks are illustrated in FIG. 1 in order to form the conductive paths 17 and 19, whereas only a single X direction conductive track is required in FIG. 2.

Figure 3:
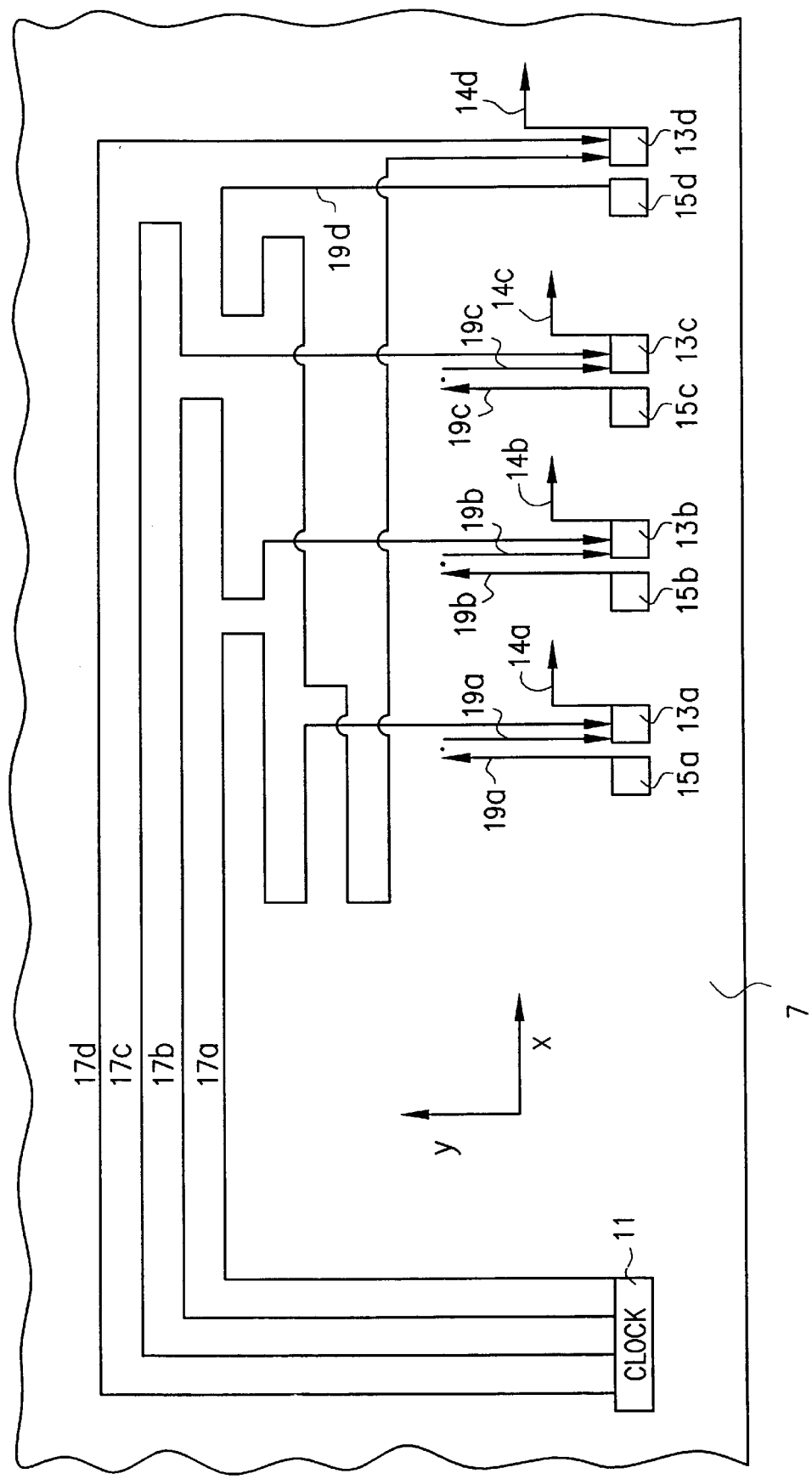
FIG. 3 illustrates the FIG. 1 embodiment in a digital device with a plurality of data inputs.

Thus far the invention has been described in simplified form with respect to only a single data input terminal 15. For most digital devices such as processors, memories, etc. a plurality of data input terminals will be provided. Accordingly, FIG. 3 illustrates an arrangement in which a plurality of data terminals 15a, 15b, 15c, 15d are provided in association with a plurality of respective latches 13a, 13b, 13c, 13d. The latches are respectively coupled to data terminals by a first conductive path 19a, 19b, 19c, 19d, and are also coupled to a common clock terminal 11 by respective conductive paths 17a, 17b, 17c, and 17d. It should be understood that although four latches and associated data terminals are illustrated in FIG. 3, for simplicity any number of latches and associated data terminals can be provided.

Similar to the FIG. 1 arrangement, each of the latches 13a . . . 13d are provided in close proximity to respective data terminals 15a . . . 15d. Once again, the conductive paths between each of the latches 13a . . . 13d and the clock terminal 11 are of approximately the same length as the conductive paths 19a . . . 19d connecting the latches 13a . . . 13d to their respective data terminals 15a . . . 15d. FIG. 3 also illustrates that in the illustrated implementation a serpentine path is required in order to ensure that the conductive paths 17a . . . 17d are approximately equal in length to their counterpart conductive paths 19a . . . 19d. In the FIG. 3 arrangement all of the conductive paths are approximately equal.

Figure 4:
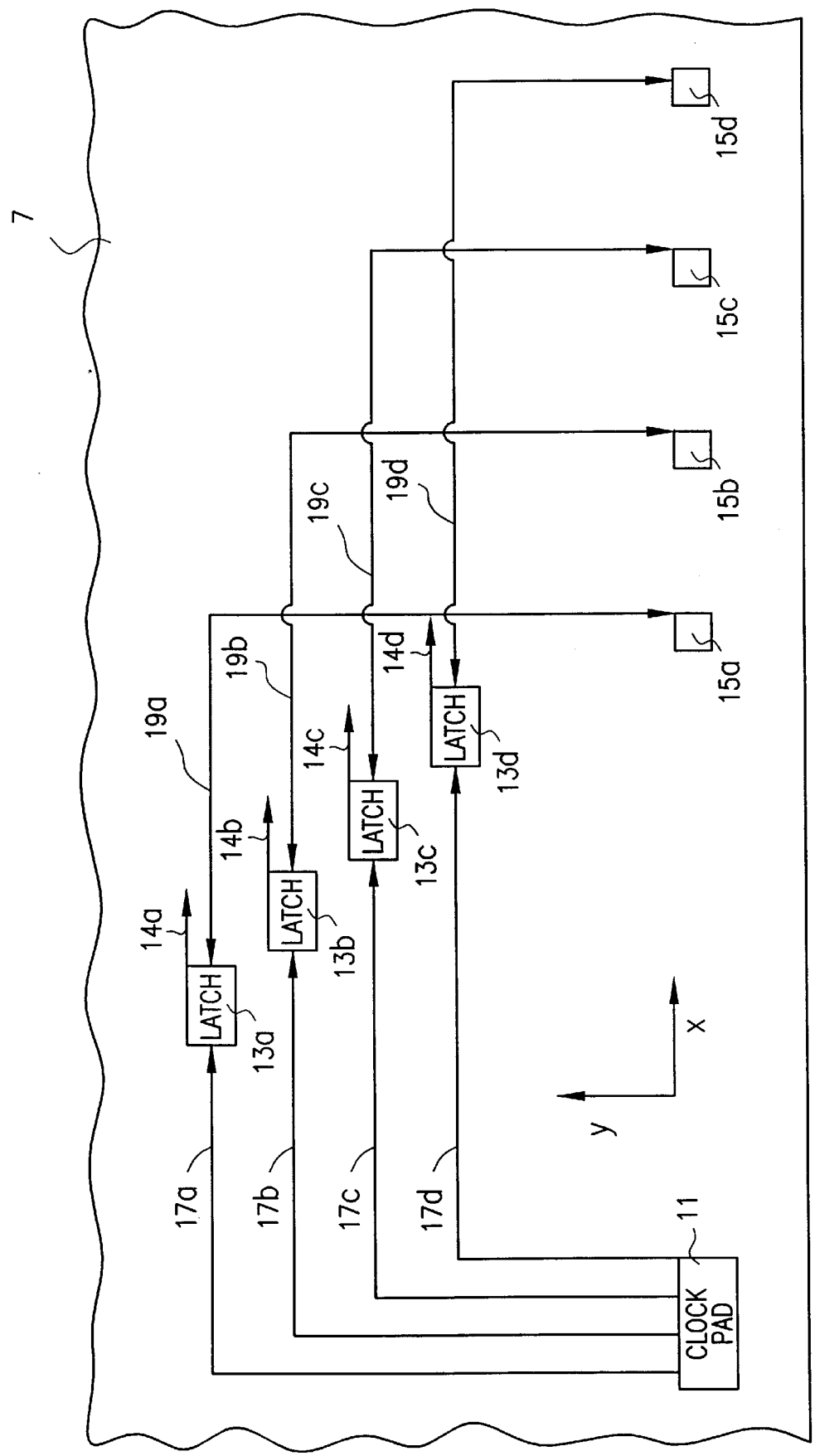
FIG. 4 illustrates the FIG. 2 embodiment in a digital device with a plurality of data inputs.

FIG. 4 illustrates a centered latch embodiment similar that of FIG. 2, but now in the context of a data device having a plurality of data terminals 15a . . . 15d and associated data latches 13a . . . 13d. In the FIG. 4 arrangement, each of the latches 13a . . . 13d has associated conductive paths 17a and 19a, which are approximately equal to one another. In addition, each of the latches is physically centered approximately midway of the clock terminal 11 and a respective data terminal 15 in the X direction of the die. Once again, this simplifies routing of the conductive paths as each of the respective path pairs 17a, 19a; 17b, 19b; 17c, 19c; and 17d, 19d are co-linear.

Because the data latches 13a . . . 13d are approximately centered physically in the X direction, as opposed to the latches 13a . . . 13c in the FIG. 3 arrangement, each latch 13a . . . 13d in the FIG. 4 requires only four conductive tracks in the X direction, one for each latch, whereas in the FIG. 3 embodiment, multiple tracks formed by serpentine conductive paths are required in the die X direction in order to ensure that the conductive paths of a latch which connect to the clock terminal 11 and to a respective data terminal 15 are approximately equal. Although the conductive paths 17a, 17b, 17c, 17d, and 19a, 19b, 19c, 19d for a given latch in FIG. 4 are approximately equal in length, the conductive paths from latch-to-latch need not be of approximately equal length.

It should be restated that although the invention is being described with respect to approximately equal conductive path 17, 19 lengths for each latch, in the most preferred embodiment the conductive paths 17, 19 will actually be substantially equal in length for each latch.

Figure 5:
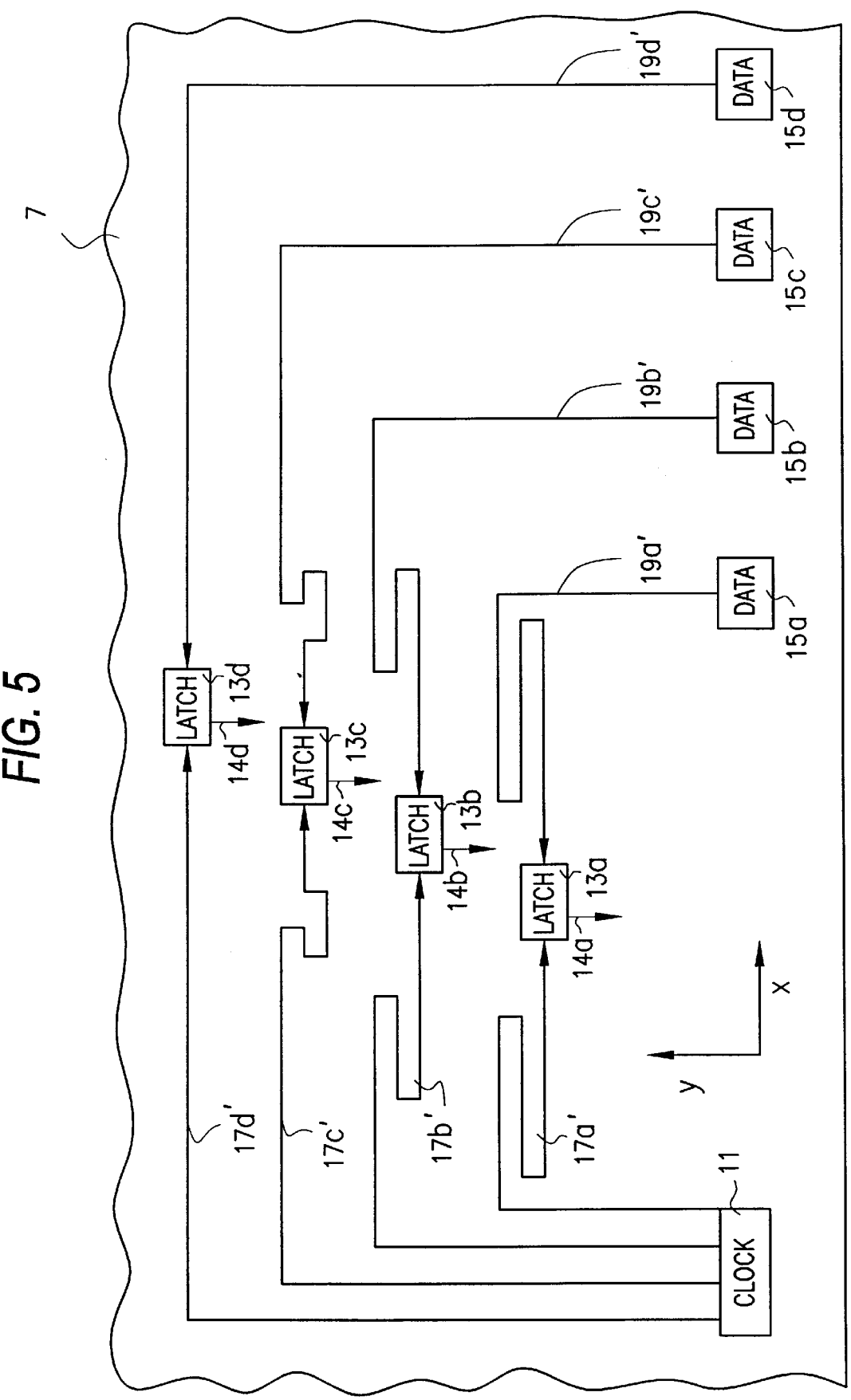
FIG. 5 is a block diagram illustrating a third embodiment of a data capture arrangement in a digital device in accordance with the invention.

FIG. 5 illustrates yet another embodiment of the invention which is similar to that of FIG. 4, but in which all of the latches 13a . . . 3d are centered relative to the respective data terminals 15a . . . 15d in the X direction of the die and, in addition, the latches are centered such that all of the conductive paths between the respective latch and a clock, i.e., 17a . . . 17d, are approximately equal to all of the conductive paths 19a . . . 19d between the latches and the respective data terminals 15a . . . 15d.

Figure 6:
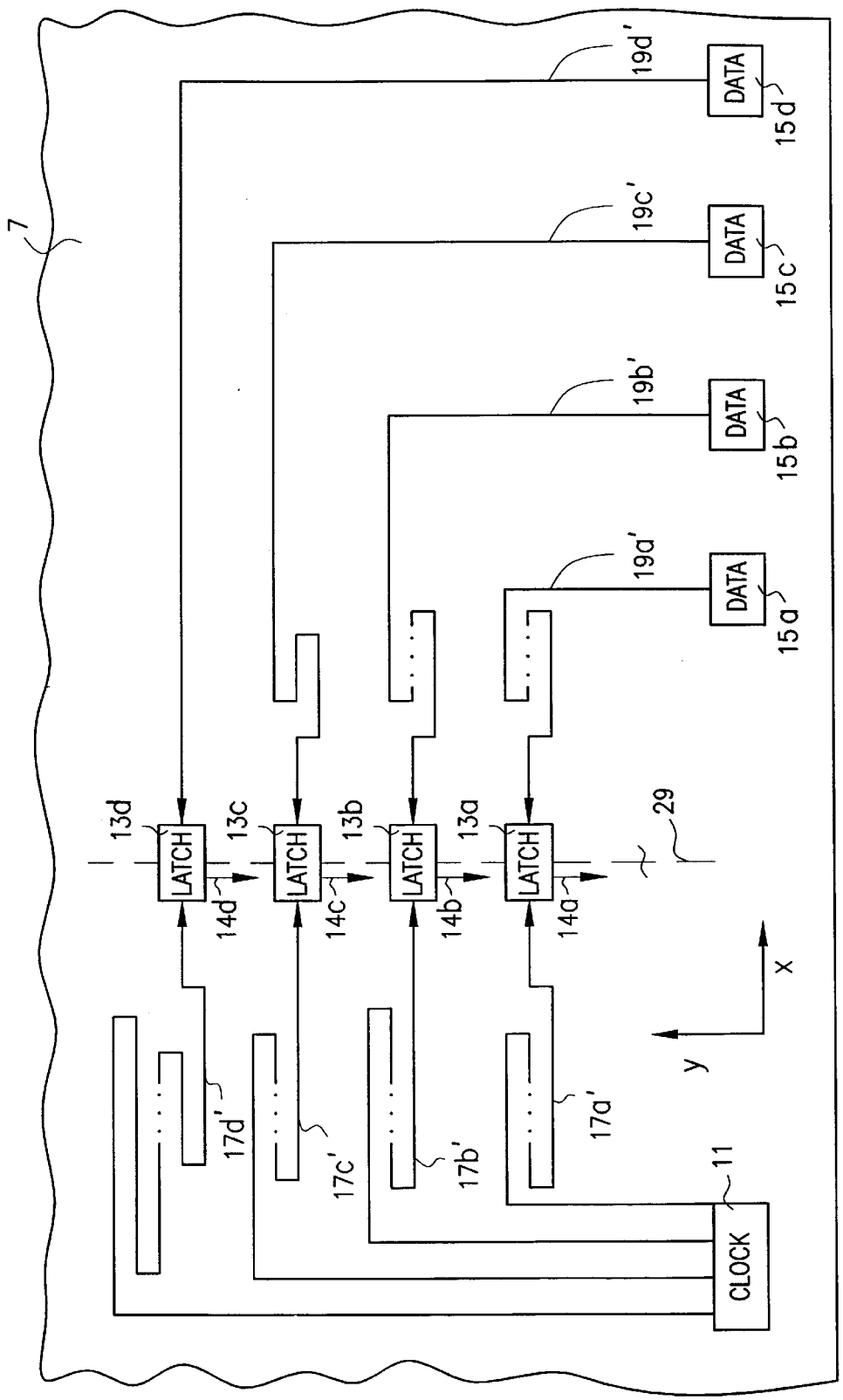
FIG. 6 is a block diagram illustrating a fourth embodiment of a data capture arrangement in a digital device in accordance with the invention.

FIG. 6 illustrates yet another embodiment of the invention in which each of the latches 13a . . . 13d is arrayed on the digital device die along a linear path 29 in the Y direction of the die. Once again, the conductive paths 17a . . . 17d and 19a . . . 19d for any given latch are approximately equal to one another. Moreover, in the FIG. 6 arrangement, the conductive paths 17a . . . 17d and 19a . . . 19d are for all latches approximately equal to one another. As in other embodiments, FIG. 6 shows many of the conductive paths 17a . . . 17d and 19a . . . 19d as having serpentine configurations in which the conductive path runs back and forth across the die in order to achieve the desired conductive path length matching.

As discussed above with reference to the FIG. 4 arrangement, it is not necessary in the FIG. 4 arrangement that each pair of conductive paths 17, 19 associated with a given latch be approximately equal in length to the pair of conductive paths 17, 19 for another latch. That is, the conductive paths 17a and 19a for latch 13a may be approximately equal to one another, but need not be approximately equal to the conductive paths 17b and 19b for latch 13b. In the FIG. 6 arrangement, all path lengths 17a . . . 17d and 19a . . . 19d are approximately equal to one another.

Figure 7:
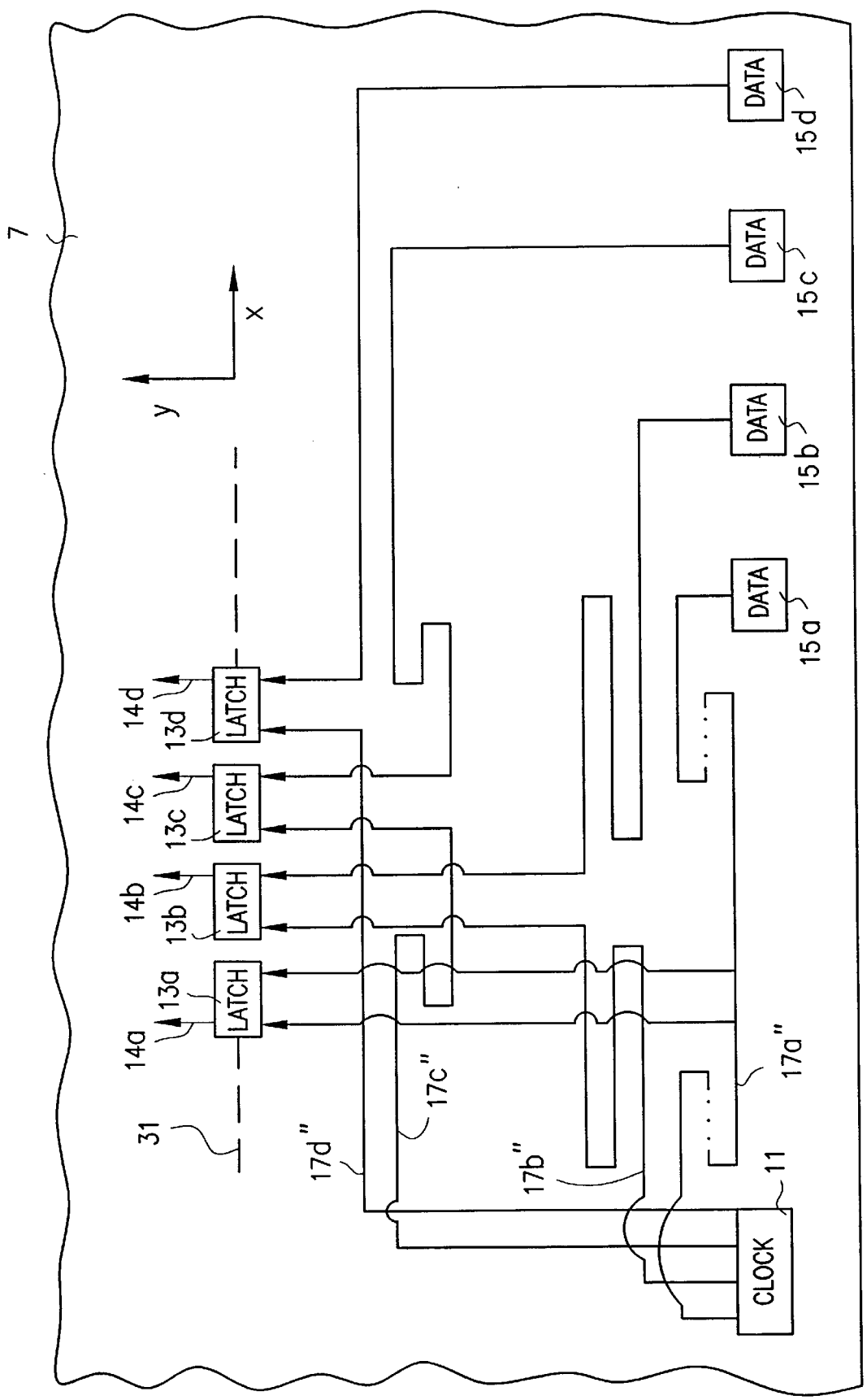
FIG. 7 is a block diagram illustrating a fifth embodiment of a data capture arrangement in a digital device in accordance with the invention.

FIG. 7 illustrates yet another embodiment in which each of the latches 13a, 13b, 13c, 13d are physically centered between the clock terminal 11 and each of the respective data terminals 15a . . . 15d, but in which the latches are now arrayed along a linear path 31 in substantially the X direction of the die: that is, the direction along which the clock and data terminals are arrayed. The data conductive paths 17a, 17b, 17c, 17d are approximately equal to the conductive paths 19a, 19b, 19c, 19d for each latch 13a, 13b, 13c, and 13d, and the conductive paths from latch-to-latch may be approximately equal or not.

The data capture circuit of the invention may be applied to any digital device which is capable of capturing data off of a data bus or from another digital device. This would include processors and memory devices, as well as other digital devices. The invention is particularly useful for high speed DRAM memory devices, and for a memory module containing a mounting substrate on which a plurality of DRAM memory devices are arranged.

While the various embodiments of the invention have been described and illustrated with reference to connecting a latch 13 with a point-to-point connections to a clock terminal 11 and a data terminal 15, all embodiments can also be used with a clock buffer and/or data buffer connected to respective clock and data terminals as long as the path length rules described above are still used from the output of the buffers to the latches.

Figure 8:
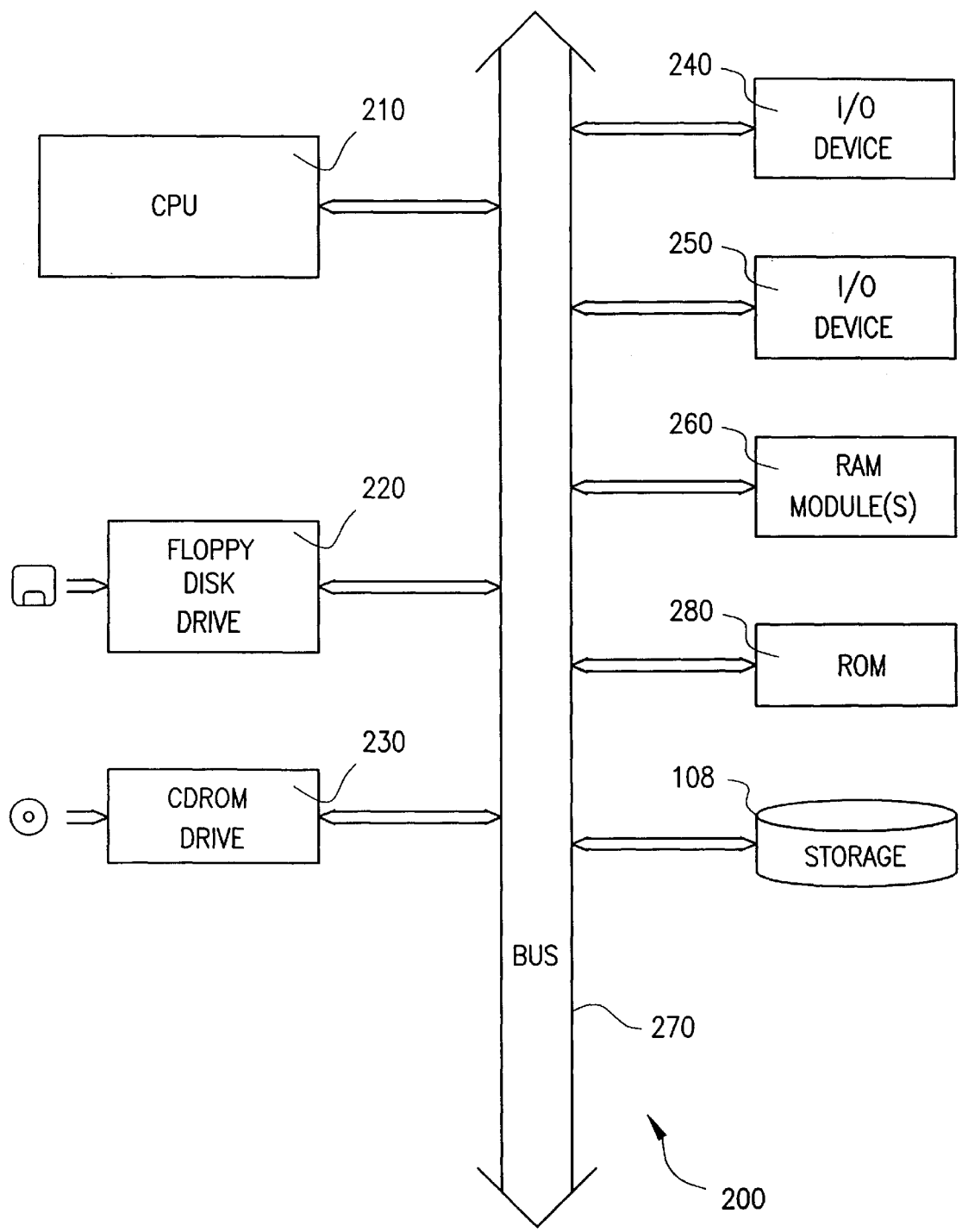
FIG. 8 is a block diagram of an exemplary processor system containing digital devices which may employ the invention.

FIG. 8 illustrates a processor system having digital devices which incorporate the invention.

As shown in FIG. 8, a processor system, such as a computer system, for example, generally includes a central processing unit CPU 210, for example, a microprocessor, that communicates with one or more input/output (I/O) devices 240, 250 over a bus 270. The processor system 200 also includes random access memory RAM 260, coupled to CPU 210. RAM 260 may be formed of one or more separate memory devices arranged, for example, on a memory module. Alternatively, RAM 260 may be integrated on the same die as CPU 210. The processor system may also include a read only memory ROM 280 and may include peripheral devices such as a floppy disk drive 220 and a compact disk CD ROM drive 230 which also communicate with CPU 210 over the bus 270. At least one of the CPU 210 and the memory devices forming RAM 260 has the data capture circuit described above and illustrated with respect to FIGS. 1–7.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. An integrated digital device comprising;
   at least one data terminal for receiving an externally applied data signal;
   a clock terminal for receiving an externally applied clock signal;
   at least one latch for latching in data received at said at least one data terminal in accordance with a clock signal received at said clock terminal;
   at least one first conductive path connecting said at least one data terminal to said latch; and
   at least one second conductive path connecting said clock terminal to said at least one latch;
   said at least one first and second conductive paths being approximately equal in length.

2. An integrated digital device as in claim 1 further comprising a plurality of data terminals for respectively receiving externally applied data signals,
   a plurality of latches for latching in data signals received at respective data terminals in accordance with a clock signal received at said clock terminal;
   a plurality of first conductive paths connecting a respective data terminal with a respective latch;
   a plurality of second conductive paths connecting said clock terminal with a respective latch;
   the first and second conductive paths for a said latch being approximately equal in length.

3. An integrated digital device as in claim 2 wherein the first and second conductive paths for a said latch are approximately equal in length to the first and second conductive paths for another latch.

4. An integrated digital device as in claim 2 wherein the first and second conductive paths for a said latch are not approximately equal in length to the first and second conductive paths for another latch.

5. An integrated digital device as in claim 2 wherein said latches are provided within said integrated digital device at locations which are near the respective data terminals to which said latches are connected.

6. An integrated digital device as in claim 2 wherein said latches are provided within said integrated digital device at locations which are spaced away from the respective data terminals to which said latches are connected.

7. An integrated digital device as in claim 6 wherein at least one of said latches is spaced approximately midway in a predetermined direction of said device between said clock terminal and a respective data terminal.

8. An integrated digital device as in claim 7 wherein each of said latches is spaced approximately midway in a predetermined direction of said device between said clock terminal and a respective data terminal.

9. An integrated digital device as in claim 3 wherein the first and second conductive paths are approximately equal in length for all of said latches.

10. An integrated digital device as in claim 2 wherein at least some of said first and said conductors form a serpentine conductive path.

11. An integrated digital device as in claim 9 wherein at least some of said first and said conductors form a serpentine conductive path.

12. An integrated digital device as in claim 10 wherein all of said latches are arrayed along a linear path within said integrated circuit.

13. An integrated digital device as in claim 11 wherein all of said latches are arrayed along a linear path within said integrated digital device.

14. An integrated digital device as in claim 10 wherein all of said latches are not arrayed along a linear path within said integrated digital device.

15. An integrated digital device as in claim 11 wherein all of said latches are not arrayed along a linear path with said integrated digital device.

16. An integrated digital device as in claim 1 wherein a portion of said at least one first conductive path which connects with said at least one latch is co-linear with a portion of said at least one second conductive path which connects with said at least one latch.

17. An integrated digital device as in any one of claims 1 and 2 wherein said at least one first and second conductive paths are substantially equal in length.

18. An integrated digital device as in claim 3 wherein the first and second conductive paths for a said latch are substantially equal in length to the first and second conductive paths for another latch.

19. An integrated digital device as in claim 9 wherein the first and second conductive paths are substantially equal in length for all of said latches.

20. An integrated memory circuit comprising:
   at least one data terminal for receiving an externally applied data signal for storage in a storage array of said memory circuit;
   a clock terminal for receiving an externally applied clock signal;
   at least one latch for latching in data received at said at least one data terminal in accordance with a clock signal received at said clock terminal and having an output for providing a data signal to said storage array;
   at least one first conductive path connecting said at least one data terminal to said at least one latch; and
   at least one second conductive path connecting said clock terminal to said at least one latch;
   said at least one first and second conductive paths being approximately equal in length.

21. An integrated memory circuit as in claim 20 further comprising:
   a plurality of data terminals for respectively receiving externally applied data signals,
   a plurality of latches for latching in data signals received at respective data terminals in accordance with a clock signal received at said clock terminal;
   a plurality of first conductive paths connecting a respective data terminal with a respective latch;
   a plurality of second conductive paths connecting said clock terminal with a respective latch;
   the first and second conductive paths for a said latch being approximately equal in length.

22. An integrated memory circuit as in claim 21 wherein the first and second conductive paths for a said latch are approximately equal in length to the first and second conductive paths for another latch.

23. An integrated memory circuit as in claim 21 wherein the first and second conductive paths for a said latch are not approximately equal in length to the first and second conductive paths for another latch.

24. An integrated memory circuit as in claim 21 wherein said latches are provided within said integrated memory circuit at locations which are near the respective data terminals to which said latches are connected.

25. An integrated memory circuit as in claim 21 wherein said latches are provided within said integrated memory circuit at locations which are spaced away from the respective data terminals to which said latches are connected.

26. An integrated memory circuit as in claim 25 wherein at least one of said latches is spaced approximately midway in a predetermined direction of said device between said clock terminal and a respective data terminal.

27. An integrated memory circuit as in claim 26 wherein each of said latches is spaced approximately midway in a predetermined direction of said device between said clock terminal and a respective data terminal.

28. An integrated memory circuit as in claim 22 wherein the first and second conductive paths are approximately equal in length for all of said latches.

29. An integrated memory circuit as in claim 21 wherein at least some of said first and said conductors form a serpentine conductive path.

30. An integrated memory circuit as in claim 28 wherein at least some of said first and said conductors form a serpentine conductive path.

31. An integrated memory circuit as in claim 29 wherein all of said latches are arrayed along a linear path within said integrated circuit.

32. An integrated memory circuit as in claim 30 wherein all of said latches are arrayed along a linear path within said integrated circuit.

33. An integrated memory circuit as in claim 21 wherein all of said latches are not arrayed along a linear path with said integrated memory circuit.

34. An integrated memory circuit as in claim 28 wherein all of said latches are not arrayed along a linear path with said integrated circuit.

35. An integrated memory circuit as in claim 20 wherein a portion of said at least one first conductive path which connects with said at least one latch is co-linear with a portion of said at least one second conductive path which connects with said at least one latch.

36. An integrated memory circuit as in any one of claims 20 and 21 wherein said at least one first and second conductive paths are substantially equal in length.

37. An integrated memory circuit as in claim 22 wherein the first and second conductive paths for a said latch are substantially equal in length to the first and second conductive paths for another latch.

38. An integrated memory circuit as in claim 37 wherein the first and second conductive paths are substantially equal in length for all of said latches.

39. A processing system comprising:
   a processor for processing data; and
   a memory device coupled to said processor;
   at least one of said processor and memory device comprising a data capture circuit, said data capture circuit comprising:
      at least one data terminal for receiving an externally applied data signal;
      a clock terminal for receiving an externally applied clock signal;
      at least one latch for latching in data received at said at least one data terminal in accordance with a clock signal received at said clock terminal;
      at least one first conductive path connecting said at least one data terminal to said at least one latch; and
      at least one second conductive path connecting said clock terminal to said at least one latch;
      said at least one first and second conductive paths being approximately equal in length.

40. A processing system as in claim 39 further comprising:
   a plurality of data terminals for respectively receiving externally applied data signals,
   a plurality of latches for latching in data signals received at a respective data terminal in accordance with a clock signal received at said clock terminal;
   a plurality of first conductive paths connecting a respective data terminal with a respective latch;
   a plurality of second conductive paths connecting said clock terminal with a respective latch;

the first and second conductive paths for a said latch being approximately equal in length.

41. A processing system as in claim 40 wherein the first and second conductive paths for a said latch are approximately equal in length to the first and second conductive paths for another latch.

42. A processing system as in claim 40 wherein the first and second conductive paths for a said latch are not approximately equal in length to the first and second conductive paths for another latch.

43. A processing system as in claim 40 wherein said latches are provide within said at least one processor and memory device at locations which are near the respective data terminals to which said latches are connected.

44. A processing system as in claim 40 wherein said latches are provided within said at least one processor and memory device at locations which are spaced away from the respective data terminals to which said latches are connected.

45. A processing system as in claim 44 wherein at least one of said latches is spaced approximately midway between said clock terminal and a respective data terminal.

46. A processing system as in claim 45 wherein each of said latches is spaced approximately halfway between said clock terminal and a respective data terminal.

47. A processing system as in claim 41 wherein the first and second conductive paths are approximately equal in length for all of said latches.

48. A processing system as in claim 40 wherein at least some of said first and said conductors form a serpentine conductive path.

49. A processing system as in claim 47 wherein at least some of said first and said conductors form a serpentine conductive path.

50. A processing system as in claim 48 wherein all of said latches are arrayed along a linear path within said at least one processor and memory device.

51. A processing system as in claim 49 wherein all of said latches are arrayed along a linear path within said at least one processor and memory device.

52. A processing system as in claim 40 wherein all of said latches are not arrayed along a linear path with said at least one processor and memory device.

53. A processing system as in claim 47 wherein all of said latches are not arrayed along a linear path with said at least one processor and memory device.

54. A processing system as in claim 39 wherein a portion of said at least one first conductive path which connects with said at least one latch is co-linear with a portion of said at least one second conductive path which connects with said at least one latch.

55. A processing system as in any one of claims 39 and 40 wherein said at least one first and second conductive paths are substantially equal in length.

56. A processing system as in claim 41 wherein the first and second conductive paths for a said latch are substantially equal in length to the first and second conductive paths for another latch.

57. A processing system as in claim 46 wherein the first and second conductive paths are substantially equal in length for all of said latches.

58. An integrated circuit memory device comprising:
    at least one data terminal for receiving an externally applied data signal for storage in a storage array of said memory circuit;
    a clock terminal for receiving an externally applied clock signal;
    at least one latch for latching in data received at said at least one data terminal in accordance with a clock signal received at said clock terminal and having an output for providing said data signal to said storage array;
    at least one first conductive path connecting said at least one data terminal to said at least one latch; and
    at least one second conductive path connecting said clock terminal to said at least one latch;
    said at least one first and second conductive paths being approximately equal in length;
    wherein a portion of each of said first and second conductive paths are co-linear.

59. An integrated digital device as in claim 58 further comprising:
    a plurality of data terminals for respectively receiving externally applied data signals,
    a plurality of latches for latching in data signals received at respective data terminals in accordance with a clock signal received at said clock terminal;
    a plurality of first conductive paths connecting a respective data terminal with a respective latch;
    a plurality of second conductive paths connecting said clock terminal with a respective latch;
    wherein a portion of each of said first and second conductive paths, wherein said paths connect to a given latch, are co-linear.

60. A memory module comprising:
    a mounting substrate; and
    a plurality of memory devices provided on said substrate, at least one of said memory devices comprising:
        at least one data terminal for receiving an externally applied data signal for storage in a storage array of said memory circuit;
        a clock terminal for receiving an externally applied clock signal;
        at least one latch for latching in data received at said at least one data terminal in accordance with a clock signal received at said clock terminal and having an output for providing said data signal to said storage array;
        at least one first conductive path connecting said at least one data terminal to said latch; and
        at least one second conductive path connecting said clock terminal to said at least one latch;
        said at least one first and second conductive paths being approximately equal in length.

61. A memory module as in claim 60 wherein said at least one memory device further comprises:
    a plurality of data terminals for respectively receiving externally applied data signals,
    a plurality of latches for latching in data signals received at respective data terminals in accordance with a clock signal received at said clock terminal;
    a plurality of first conductive paths connecting a respective data terminal with a respective latch;
    a plurality of second conductive paths connecting said clock terminal with a respective latch;
    the first and second conductive paths for a said latch being approximately equal in length.

62. A memory module as in claim 61 wherein the first and second conductive paths for a said latch are approximately equal in length to the first and second conductive paths for another latch.

63. A memory module as in claim 61 wherein said latches are provided within said integrated memory circuit at locations which are spaced away from the respective data terminals to which said latches are connected.

64. A memory module as in claim 63 wherein at least one of said latches is spaced approximately midway in a predetermined direction of said device between said clock terminal and a respective data terminal.

65. A memory module as in claim 64 wherein each of said latches is spaced approximately midway in a predetermined direction of said device between said clock terminal and a respective data terminal.

66. A memory module as in claim 64 wherein the first and second conductive paths are approximately equal in length for all of said latches.

67. A memory module as in any one of claims 63 and 64 wherein said at least one first and second conductive paths are substantially equal in length.

68. A memory module as in claim 64 wherein the first and second conductive paths for a said latch are substantially equal in length to the first and second conductive paths for another latch.

69. A memory module as in claim 38 wherein the first and second conductive paths are substantially equal in length for all of said latches.

70. A method of fabricating a data capture circuit for an integrated circuit, said method comprising:

forming at least one latch circuit within said integrated circuit;

forming at least one data terminal for receiving an externally supplied data signal;

forming a clock terminal for receiving an externally applied clock signal;

forming at least one first conductive path connecting said at least one data terminal to said at least one latch circuit;

forming a second conductive path connecting said clock terminal to said at least one latch circuit; and arranging respective path lengths of said formed first and second conductive paths to be approximately equal.

71. A method as in claim 70 further comprising:

forming a plurality of data terminals for respectively receiving externally applied data signals;

forming a plurality of latches for latching in data signals received at respective data terminals in accordance with a clock signal received at said clock terminal;

forming a plurality of first conductive paths connecting a respective data terminal with a respective latch;

forming a plurality of second conductive paths connecting said clock terminal with respective latches;

arranging said first and second conductive paths for a latch to be approximately equal in length.

72. A method as in claim 71 further comprising arranging the first and second conductive paths for a said latch to be approximately equal in length to the first and second conductive paths for another latch.

73. A method as in claim 71 further comprising arranging the first and second conductive paths for a said latch to be approximately equal in length to the first and second conductive paths for another latch.

74. A method as in claim 71 further comprising arranging said latches within said integrated circuit at locations which are near the respective data terminals to which said latches are connected.

75. A method as in claim 71 further comprising arranging said latches within said integrated circuit at locations which are spaced away from the respective data terminals to which said latches are connected.

76. A method as in claim 75 further comprising arranging at least one of said latches to be approximately midway between said clock terminal and a respective data terminal.

77. A method as in claim 76 further comprising arranging each of said latches to be approximately midway between said clock terminal and a respective data terminal.

78. A method as in claim 73 further comprising arranging the first and second conductive paths are approximately equal in length for all of said latches.

79. A method as in claim 72 further comprising arranging at least some of said first and said conductors in a serpentine conductive path.

80. A method as in claim 78 further comprising arranging at least some of said first and said conductors in a serpentine conductive path.

81. A method as in claim 79 further comprising arranging said latches along a linear path within said integrated circuit.

82. A method as in claim 80 further comprising arranging all of said latches along a linear path within said integrated circuit.

83. A method as in claim 72 wherein said integrated circuit is an integrated memory circuit.

84. A method as in claim 70 further comprising arranging a portion of said at least one first conductive path which connects with said at least one latch to be co-linear with a portion of said at least one second conductive path which connects with said at least one latch.

85. A method as in any one of claims 70 and 71 further comprising arranging at least one first and second conductive paths to be substantially equal in length.

86. A method as in claim 72 further comprising arranging the first and second conductive paths for a said latch to be substantially equal in length to the first and second conductive paths for another latch.

87. A method as in claim 78 further comprising arranging the first and second conductive paths to be substantially equal in length for all of said latches.

* * * * *

UNITED STATES PATENT AND TRADEMARK OFFICE
CERTIFICATE OF CORRECTION

PATENT NO. : 6,590,795 B2
DATED : July 8, 2003
INVENTOR(S) : Brent Keeth et al.

It is certified that error appears in the above-identified patent and that said Letters Patent is hereby corrected as shown below:

<u>Title page,</u>
Item [56], References Cited, insert -- OTHER PUBLICATIONS – Neal Schneier, "High Speed Digital Design," IEEE Aerospace Conference – Proceedings, pp. 257-261, March 6-13, 1999. --

<u>Column 6,</u>
Lines 48 and 51, replace "said first and said conductors" with -- said first and said second conductive paths --;

<u>Column 8,</u>
Lines 5 and 8, replace "said first and said conductors" with -- said first and said second conductive paths --;

<u>Column 9,</u>
Line 12, change "provide" to -- provided --;
Lines 30 and 33, replace "said first and said conductors" with -- said first and said second conductive paths --;

<u>Column 12,</u>
Line 23, replace "are" with -- to be --;
Lines 26 and 29, replace "said first and said conductors" with -- said first and said second conductive paths --;

Signed and Sealed this

Twenty-fifth Day of May, 2004

JON W. DUDAS
*Acting Director of the United States Patent and Trademark Office*